W. H. HAVER.
LIQUID MEASURING DEVICE.
APPLICATION FILED FEB. 20, 1920.
1,366,656.
Patented Jan. 25, 1921.
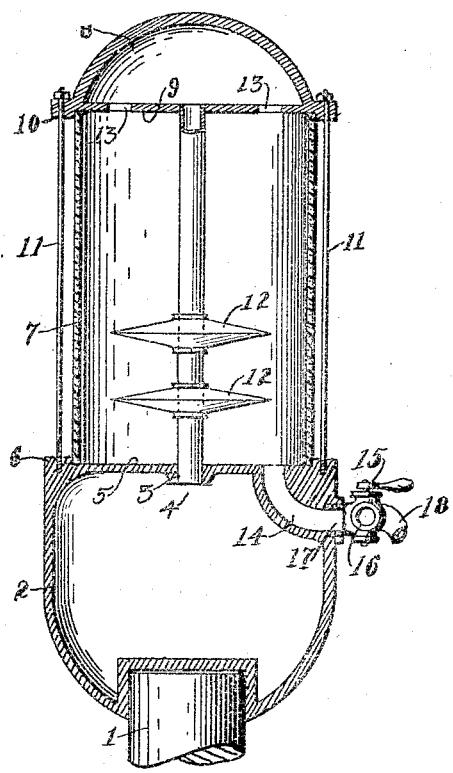
INVENTOR
William H. Haver
BY John A. Naismith
ATTORNEY

UNITED STATES PATENT OFFICE.

WILLIAM H. HAVER, OF SAN JOSE, CALIFORNIA.

LIQUID-MEASURING DEVICE.

1,366,656.     Specification of Letters Patent.     Patented Jan. 25, 1921.

Application filed February 20, 1920. Serial No. 360,044.

*To all whom it may concern:*

Be it known that I, WILLIAM H. HAVER, a citizen of the United States, and resident of San Jose, in the county of Santa Clara and State of California, have invented certain new and useful Improvements in Liquid-Measuring Devices, of which the following is a specification.

My invention relates to a measuring device for use particularly in dispensing fuel oil for motor vehicles.

It is the object of my invention to provide a device of the character indicated that can be readily installed for use in connection with ordinary type of dispensing devices now in use; that is provided with adjustable measuring members clearly visible to the purchaser but positioned within the device; that will be positive and accurate and show clearly to a purchaser the quantity of fuel he is receiving.

In the drawing, the figure is a vertical transverse section through a device embodying my invention.

Referring more particularly to the drawing, 1 is a portion of a suitable standard carrying an air reservoir 2, the latter being inclosed except at 3 where a pipe 4 is mounted vertically to communicate therewith. The outer upper surface of chamber 2 is flat as shown at 5 and is provided with an annular flange 6. Supported on surface 5 and positioned by flange 6 is a glass cylinder 7 having a second air chamber 8 positioned thereon, the chamber 8 having a flat lower surface 9 provided with an annular flange 10 to engage the upper edge of glass cylinder 7. These three members 2—7 and 8 are securely fastened together by means of suitable tie rods 11. Tube 4 extends upwardly and is secured into the bottom plate of chamber 8 as shown and is threaded throughout its length and fitted with several disks as shown at 12. A plurality of openings are provided in the bottom of chamber 8 as shown at 13 forming open communication between the same and cylinder 7.

At 14 is shown a passage formed in chamber 2 and communicating with cylinder 7 and having a two-way cock attached thereto as at 15, liquid entering the same at 16 and passing into cylinder 7 through passage 17 or directly to a waiting tank through conduit 18 as the case may be.

In its practical application accurately measured quantities of liquid are placed in cylinder 7 and the several disks turned upward or downward upon rod 4 to bring them to their several positions where their outer edges coincide with the upper surfaces of the several different quantities of liquid placed therein. Assuming that the lower disk has been adjusted to measure one gallon and the second disk two gallons and a purchaser has ordered one gallon of fuel oil for his tank. The valve 15 is first turned to cut off conduit 18 and open to passage 17 and then the oil is pumped into cylinder 7 until the surface of the liquid coincides with the outer edge of the lower or first disk. This point being reached the valve 15 is turned until the inlet 16 is cut off and conduit 18 opened. The chambers 2 and 8 and cylinder 7 being ordinarily filled with air at atmospheric pressure, the pressure therein is raised by the entrance of the fuel oil, therefore this oil is rapidly discharged by this air pressure when conduit 18 is opened.

With a device of this kind the amount of fuel delivered is always known. While the device may be made in many different sizes according to the service required the measuring members 12 and the tube 4 may be uniform in size since the members 12 are adjustable to the height of the liquid which would of course vary with the diameter of the cylinder. If the measuring device is not desired in certain instances, the valve 15 may be turned so that the liquid will pass directly from the inlet 16 to the conduit 18 without passing into the said measuring device.

It is understood of course, that while I have herein shown and described one specific embodiment of my invention I do not wish to confine myself to the specific embodiment shown but to include all changes in the invention that may be included within the scope of the appended claims.

I claim:—

1. In a liquid measuring device, a transparent liquid chamber, a vertically positioned member fixedly mounted therein, an indicator element adjustably mounted on said member, means for supplying liquid to said chamber, and means for discharging liquid from said chamber.

2. In a liquid measuring device, a transparent liquid chamber, a vertically positioned cylindrical member secured therein and externally threaded throughout its length, a plurality of threaded indicators mounted on said cylindrical member, and a valve controlled inlet and outlet passage communicating with said liquid chamber.

WILLIAM H. HAVER.